US008942229B2

(12) United States Patent
Wijayanathan et al.

(10) Patent No.: US 8,942,229 B2
(45) Date of Patent: Jan. 27, 2015

(54) METHOD AND APPARATUS FOR CONSERVING BATTERY LIFE AND NETWORK RESOURCES UNDER ABNORMAL CALL RELEASE CONDITIONS

(75) Inventors: Maiyuran Wijayanathan, Waterloo (CA); Noushad Naqvi, Waterloo (CA); Shaik Mohammed Kabeer Ahmed, Staines (GB)

(73) Assignee: BlackBerry Limited, Waterloo (CA)

( * ) Notice: Subject to any disclaimer, the term of this patent is extended or adjusted under 35 U.S.C. 154(b) by 1040 days.

(21) Appl. No.: 12/393,740

(22) Filed: Feb. 26, 2009

(65) Prior Publication Data

US 2010/0216436 A1 Aug. 26, 2010

(51) Int. Cl.
*H04L 12/66* (2006.01)
*H04W 76/06* (2009.01)
*H04W 52/02* (2009.01)

(52) U.S. Cl.
CPC ........ *H04W 76/068* (2013.01); *H04W 52/0232* (2013.01)
USPC ............ 370/352; 370/338; 370/351; 370/231

(58) Field of Classification Search
USPC ............................ 370/311, 351, 463; 455/453
See application file for complete search history.

(56) References Cited

U.S. PATENT DOCUMENTS

| | | | | |
|---|---|---|---|---|
| 7,054,268 | B1* | 5/2006 | Parantainen et al. | 370/231 |
| 7,898,995 | B2* | 3/2011 | Shahidi et al. | 370/311 |
| 2005/0141541 | A1* | 6/2005 | Cuny et al. | 370/437 |
| 2007/0259673 | A1* | 11/2007 | Willars et al. | 455/453 |
| 2007/0274284 | A1* | 11/2007 | Dendukuri et al. | 370/351 |
| 2008/0037517 | A1* | 2/2008 | Emborg | 370/352 |
| 2008/0039086 | A1* | 2/2008 | Gallagher et al. | 455/435.1 |
| 2008/0123527 | A1 | 5/2008 | Shahidi et al. | |
| 2008/0198871 | A1* | 8/2008 | Shahidi et al. | 370/465 |
| 2008/0304510 | A1* | 12/2008 | Qu | 370/463 |
| 2010/0124211 | A1* | 5/2010 | Payyappilly et al. | 370/338 |

FOREIGN PATENT DOCUMENTS

| | | |
|---|---|---|
| EP | 1684532 | 7/2006 |
| WO | 2006059932 | 6/2006 |

OTHER PUBLICATIONS

3GPP TS 43.318 V8.3.0 (Aug. 2008), 3rd Generation Partnership project, Release 8.*
Extended European Search Report, EP 09153834-8 dated Jun. 5, 2009.
Kabir Kasargod; Mike Sheppard; Marco Coscia; Packet Data in the Ericsson CDMA 2000 Radio Access Network; Ericsson Review No. 3, 2002 http://www.ericsson.com/ericsson/corpinfo/publications/review/2002_03/files/2002031.pdf.
"3rd Generation Partnership Project; Technical Specification Group GSM/EDGE Radio Access Network (GAN); Stage 2 Release 8", 3GPP TS 43.318 v. 8.3.0 (Aug. 2008), sections 7 and 8.12.

* cited by examiner

*Primary Examiner* — Jinsong Hu
*Assistant Examiner* — William Nealon
(74) *Attorney, Agent, or Firm* — Moffat & Co.

(57) ABSTRACT

A method and apparatus for releasing radio resources from a mobile device for a call in a gateway to core network, the method monitoring an inactive period for call; and if the inactive period exceeds a predetermined threshold initiating a disconnection from the gateway to core network.

23 Claims, 7 Drawing Sheets

METHOD AND APPARATUS FOR CONSERVING BATTERY LIFE AND NETWORK RESOURCES UNDER ABNORMAL CALL RELEASE CONDITIONS

FIELD OF THE DISCLOSURE

The present disclosure relates to gateway to core networks such as unlicensed mobile access/generic access networks (UMA/GAN), and in particular relates to voice calls in such networks.

BACKGROUND

A generic access network (GAN), also known as a unlicensed mobile access (UMA) network, is a telecommunications system allowing handover between local area networks and wide area networks on a dual mode mobile device. The handover is seamless and can be between a cellular network such as a global system for mobile communication (GSM) network and a broadband network or Internet Protocol (IP) access network such as a wireless local area network (WLAN).

One problem with current GAN systems occurs during a mobile to mobile call if one of the mobiles abnormally releases the call. When the abnormal call release occurs, the second mobile device will not know the call has been released and keep network resources open, wasting network resources and battery life on the second mobile device. Abnormal termination may be caused, for example, by the battery being removed from the first mobile device or by the first mobile device going out of network coverage. Other abnormal call termination scenarios are also relevant.

Under the abnormal call termination, the network will eventually realize the call has been terminated and terminate the call with the second mobile device. However the eventual realization takes time, resulting in network resources and mobile device battery life being wasted.

BRIEF DESCRIPTION OF THE DRAWINGS

The present disclosure will be better understood with reference to the drawings in which.

DETAILED DESCRIPTION

As in described in more detail below, the present disclosure provides for a timer on a mobile device to start upon receipt of the last data packet in a voice call. The timer is reset if a new voice data packet is received. If the timer expires, a message is sent to a call control layer within the mobile device to send a disconnect message to the network. Logic within the call control layer can determine whether the disconnect message should be sent. In one embodiment the timer is part of, or controlled from, the real time transfer protocol (RTP) layer.

The above provides for disconnection from the network earlier than the network determination that an abnormal call termination has occurred. The disconnection saves network resources and battery life on the mobile device.

In one embodiment, the duration of the timer is configured as part of the GAN registration process, allowing each network operator to set the timer to optimize network performance.

The present disclosure therefore provides a method for releasing radio resources from a mobile device during a circuit switched call in a gateway to core network comprising: monitoring an inactive period for the circuit switched call to determine if the inactive period exceeds a predetermined threshold; and responsive to a determination that the inactive period has exceeded the predetermined threshold, initiating a disconnection from the gateway to network.

The present disclosure further provides a mobile device adapted to release radio resources for a circuit switched call in a gateway to core network comprising: a communications subsystem; a monitoring module adapted to monitor an inactive period for the circuit switched call; and a processor adapted to initiate a disconnection from the gateway to core network if the inactive period exceeds a threshold.

Figure 1:
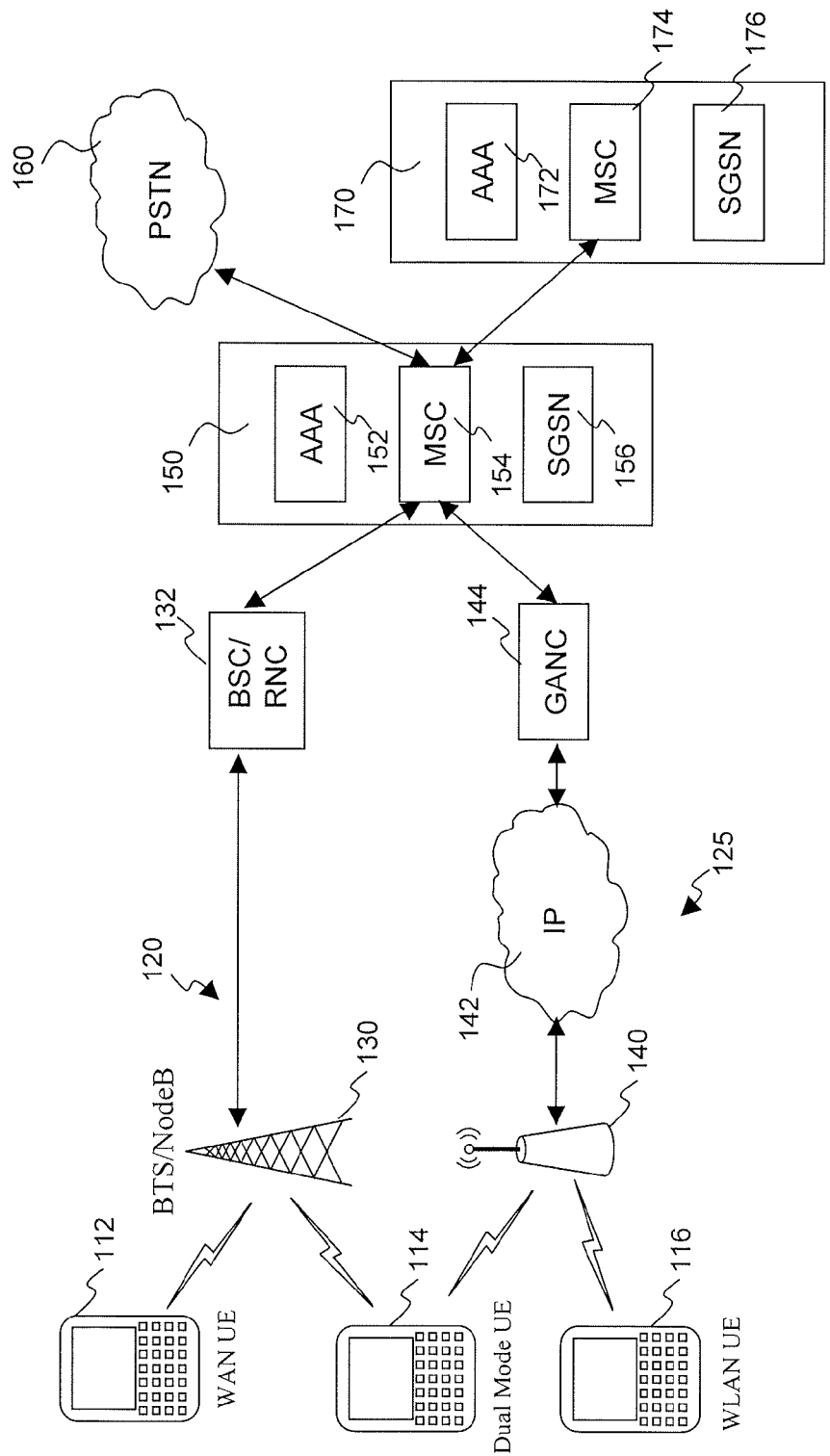
FIG. 1 is block diagram illustrating a gateway to core network architecture.

Reference is now made to FIG. 1. FIG. 1 illustrates an architectural overview for a gateway to core network. In the example of FIG. 1 the gateway to core network is a GAN network. The present disclosure is not meant to be limited to GAN, however, and GAN is used for illustrative purposes only. Other gateway to core networks could also be used. When used herein, a gateway to core network refers to an unlicensed radio access to a core network though a server such as GANC, and examples of such networks include, but are not limited to, Institute for Electronic and Electrical Engineers (IEEE) 802.11, IEEE 802.16 (WiMAX), ultra wide band (UWB), and Bluetooth™.

Three mobile devices 112, 114 and 116 are illustrated. The mobile devices 112, 114 and 116 can also be referred to as user equipment (UE).

Mobile device 112 is a single mode wide area network mobile device (WAN) which communicates with a cellular network 120.

Mobile device 116 is a single mode wireless local area network (WLAN) mobile device which communicates with a gateway to core network 125.

Mobile device 114 is a dual mode device which communicates with both cellular network 120 and WLAN network 125.

The present disclosure will be described with reference to mobile device 114, which is a dual mode mobile device, for illustrative purposes.

Mobile device 114 may connect through cellular network 120 to provide either voice or data services. As will be appreciated, various cellular networks exist, including, but not limited to, global system for mobile communication (GSM), general packet radio service (GPRS), code division multiple access (CDMA), universal mobile telecommunications system (UMTS), and wideband code division multiple access (WCDMA), among others. These technologies allow the use of voice, data or both at one time.

Cellular network 120 comprises a base transceiver station (BTS)/Node B 130 which communicates with a base station controller (BSC)/Radio Network Controller (RNC) 132. BSC/RNC 132 can access the mobile core network 150 through either the mobile switching center (MSC) 154 or the serving GPRS switching node (SGSN) 156. MSC 154 is utilized for circuit switched calls and SGSN 156 is utilized for data packet transfer. As will be appreciated, these elements are GSM/UMTS specific, but similar elements exist in other types of cellular networks.

Core network 150 further includes an authentication, authorization and accounting module 152 and can further include items such as a home location registry (HLR) or visitor location registry (VLR).

MSC 154 connects to a public switched telephone network (PSTN) 160 for circuit switched calls. Alternatively, for mobile-to-mobile calls the MSC 154 may connect to an MSC 174 of core network 170. Core network 170 similarly has an authentication, authorization and accounting module 172 and SGSN 176. MSC 174 could connect to a second mobile device through a base station controller/node B or an access point (not shown). In a further alternative embodiment, MSC 154 may be the MSC for both mobile devices on a mobile-to-mobile call.

In another mode of operation, mobile device 114 communicates over a, for example, gateway to core network access point 140. Access point 140 could use wireless fidelity (WiFi) or WiMax standards, for example.

In alternative embodiments, instead of WLAN access point 140 a Bluetooth™ access point could be used if Bluetooth™ is incorporated onto the mobile device and the mobile device is able to communicate with a Bluetooth™ access point.

The present disclosure can be utilized with other alternative access schemes which may be employed by multi-mode mobile devices, such as dual mode mobile device 114.

Utilizing the example of access point 140, the communication travels over an Internet protocol network 142 to a security gateway/generic access network controller (GANC) 144. The GANC 144 has similar functionality to BSC/RNC 132 since it allows communications to connect to a carrier's core network 150 and in particular to MSC 154 for circuit switched calls. Routing next proceeds to PSTN 160 as a regular circuit switched call.

The example above utilizing a GANC is merely meant for illustrative purposes. Other access though gateways to the core network are considered to be within the scope of the present disclosure.

The interface between GANC 144 or BSC/RNC 132 and MSC 154 is known as the A/Iu-cs interface.

The above system can allow for a mobile device to move seamlessly between a cellular network 120 and a gateway to core network 125 (or any other broadband access network). Low cost WiFi or WLAN access points can therefore be utilized, which are referred to as unlicensed coverage areas.

A problem with the above, however, exists if abnormal call termination occurs for a GAN voice call. Three scenarios which may precipitate such abnormal termination of voice calls are described below.

In a first scenario, a first mobile device, referred to as Mobile A, is an originating call mobile in a GAN network. Mobile B is a terminating point in a GAN call.

If, during the call, the battery is pulled from Mobile A, Mobile B will not realize the call has been terminated for some time. Specifically, practical tests have found that in various networks it may take up to two minutes for the network to send a disconnect message to Mobile B. During the time between the abnormal termination and the disconnect message, the circuit switched call requires dedicated radio resources to be maintained between the network and Mobile B, thereby utilizing battery life on Mobile B and wasting network resources.

A second scenario for abnormal call termination is if a call is made from Mobile A to Mobile B. Subsequently, Mobile A goes out of coverage, which ends the call on Mobile A but again the network does not send a disconnect message to Mobile B for some time. In tests it has been found networks may take up two minutes to send a disconnect message to Mobile B.

Similar tests were repeated with mobiles within GSM coverage and disconnect messages were sent to the mobiles within 20 seconds. The above indicates a considerable deficiency exists for the GAN voice calls.

A third scenario for abnormal call termination occurs when a mobile device sends corrupted packets, resulting in one of two things occurring. The MSC could intercept the corrupted packets, in which case the packet is not forwarded to the receiving mobile device and the receiving mobile device could thus consider the sending mobile has stopped sending packets. Alternatively the MSC could forward the corrupted packets, and thus the mobile would know it is still communicating with the sending mobile device. When packets are intercepted, a disconnect might be appropriate.

Figure 2:
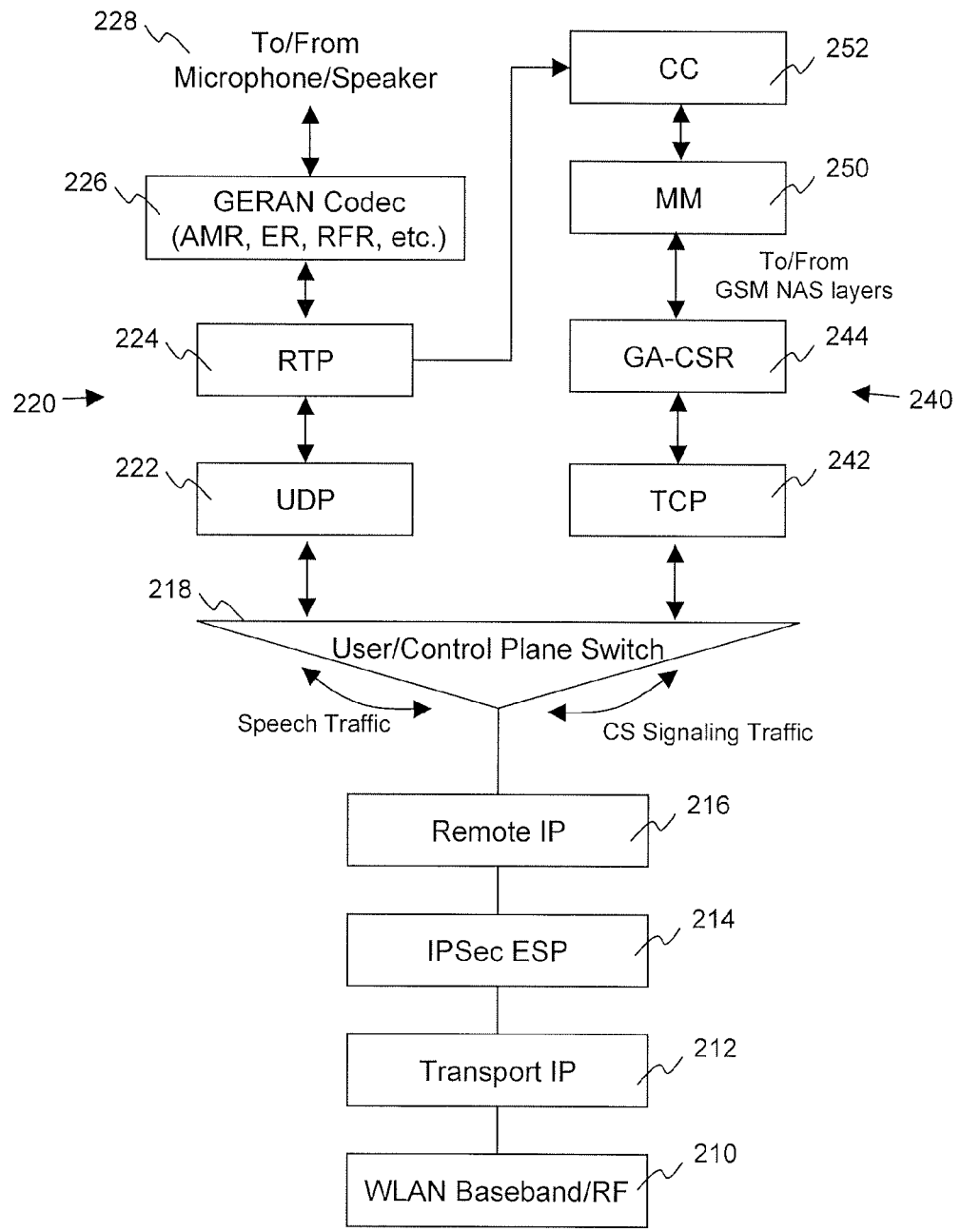
FIG. 2 is block diagram showing a protocol stack for a mobile device.

Reference is now made to FIG. 2, which illustrates a protocol stack for mobile device in a GAN network.

The physical and transport planes are illustrated using WLAN baseband/radio frequency (RF) layer 210 above which a transport Internet protocol (IP) layer 212 exists.

An Internet protocol security encapsulating security payload (IPSec ESP) layer 214 is above the transport IP layer 212 and provides origin authenticity, integrity and confidentiality protection of packets.

Above the IPSec ESP layer 214 is the remote IP layer 216.

The protocol stack of FIG. 2 has been divided into a user plane 220 and a control plane 240. A switch 218 is adapted to send control packets to the control plane and speech packets to the user plane.

In user plane 220, a user datagram protocol (UDP) layer 222 is adapted to send UDP packets. As will be appreciated by those skilled in the art, there is no confirmation between the user and a sender for UDP packets and no retransmission is utilized. UDP packets are therefore used for items such as speech or real time applications such as video.

Above UDP layer 222, a real time transfer protocol (RTP) layer 224 is utilized to provide control and synchronization of real time items and to provide time stamps for various packets.

A GSM edge radio access network code/decode (GERAN Codec) layer 226 is adapted to code or decode items from a microphone or speaker for transport over a GAN network utilizing a GSM core network.

Further, as illustrated in FIG. 2, packets from the network are converted at GERAN Codec layer 226 and are sent to a speaker. Similarly inputs from a microphone are sent to GERAN Codec layer 226. The to/from microphone or speaker layer is illustrated by reference numeral 228.

On control plane 240, a transmission control protocol (TCP) layer 242 is adapted to transmit and receive packets. In TCP layer 242, acknowledgments are utilized to ensure that packets arrive and is further adapted to resend packets that have not been acknowledged or which receive a negative acknowledgment.

Above TCP layer 242 is a generic access, circuit switched resource (GA/CSR) layer 244, which is responsible for radio bearer establishment, paging, and cipher configurations during circuit switched operations.

The GA/CSR layer 244 communicates with non access stratum layers such as a mobility management (MM) layer 250. Mobility management layer 250 tracks where subscribers are to ensure calls, SMS messages and other services can be delivered. Further, above mobility management layer 250 is a call control layer 252 which is adapted to provide call management signaling for circuit switched services.

In order to overcome the disadvantages of the prior solutions, the present disclosure provides for the addition of, or control of, a timer in the RTP layer 224. The timer T is adapted to start when the last speech packet has been received. If the timer expires, RTP layer 224 communicates with the call control layer 252 to indicate that there has been no downlink data for the period provided. The call control layer 252 then can make a decision whether to initiate a disconnect with the network by sending call disconnect signaling to the network. The decision is described in more detail below with reference to FIG. 3.

Figure 3:
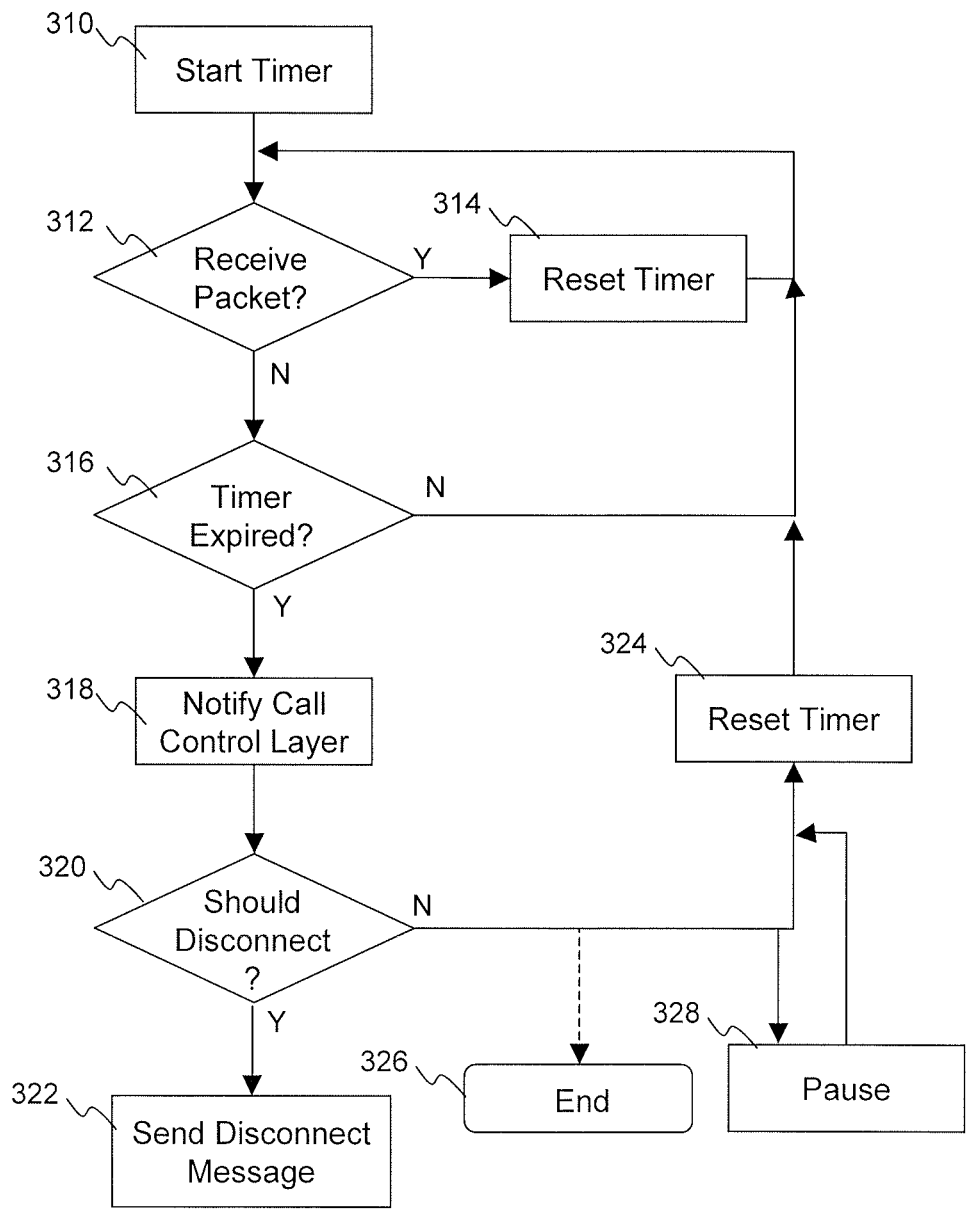
FIG. 3 is a flow diagram of a process in accordance with the present disclosure.

FIG. 3 shows a flow diagram of an exemplary method in accordance with the present disclosure. In particular, the process starts at block 310 in which a timer is started. The timer can be a software or hardware based timer T and the starting of the timer means that the timer starts to count up to a predetermined value or count down from a predetermined value.

The process then proceeds to block 312 in which a check is made to see whether a packet is received. The expected packet is a circuit switched packet and could include, for example, a voice over Internet protocol (VoIP) packet. The RTP layer 224 from FIG. 2 monitors the sending and receiving of packets and can thus control the timer that was started in block 310. In particular, if a packet is determined to have been received at block 312 then the process proceeds to block 314 in which the timer is reset. The process then proceeds back to block 312 in which a check is made to see whether a packet has been received.

If a packet has not been received, as determined in block 312, the process proceeds to block 316 in which a check is made to see whether the timer has expired. As indicated above, expiration could result from the timer counting down to zero or counting up to a timer value T, which can be for example 480 ms.

If it is determined in block 316 the timer has not expired, the process proceeds back to block 312 and continues to loop. In particular, the loop between blocks 312 and 316 without resetting of the timer in block 314 provides a determination of an inactive period. If the RTP has detected no packets for a predetermined amount of time T then the process will continue to block 318. Otherwise, the process will continue to loop between blocks 312, 316 and the resetting of the timer in block 314.

In block 318 the call control layer is notified that the timer has expired. Notification can be done in various ways. An explicit message could be sent between the RTP layer and the call control layer. Conversely, an interrupt could be triggered by the expiration of the timer, which could be handled by software within the call control layer.

In one embodiment, if the call control layer is notified that the timer has expired the call control layer could automatically send a disconnect message to the network indicating that the mobile device is disconnecting the circuit switched call.

In an alternative embodiment, the process could continue to block 320 in which a determination is made at the call control layer to determine whether disconnect should occur. In particular, the call control layer could know of certain factors and/or know the reason why no packets have been received for the predetermined time period. For example, if the call is on hold the call control layer would be notified and the lack of received packets for a predetermined time period would be explained. The call could also be waiting for the completion of a call waiting action by the other mobile device.

In one embodiment, other supplementary service logic is known to the call control layer and thus the call control layer could decide that a disconnect message should not be sent.

In a further embodiment, block 320 can make a further determination whether certain conditions exist that indicate whether a call should be disconnected. For example, if a call is muted or silent then this determination can be used to prevent disconnection. Moreover, this determination may be used to determine whether there are indicators that the call should be disconnected. Grammar analysis could be utilized for this functionality, for example by determining whether the party has indicated "are you there" or something similar. In the case where the grammar indicates that the other party may not be responding to inquiries regarding the presence of the other party, it might indicate that the call should be disconnected Further, background noise and volume levels could be considered within block 320 for this determination In a further embodiment, in block 320 a prompt might be provided to a user. In this regard, a user can confirm whether he/she wants to drop the call. The prompt can be a notification or indication to a user that an abnormal call termination by the other mobile has occurred. If a prompt is used, block 320 could either delay until a positive or negative answer is received from a user, in which case the process proceeds to block 322 with a positive answer and block 324 with a negative answer, or the process could proceed to block 324 and store any answer until the process reaches block 320 again, if ever.

If, in block 320, it is determined that the call should disconnect, the process proceeds to block 322 in which a disconnect message is sent to the network. As will be appreciated by those in the art, the sending of a disconnect message from a mobile device precedes the mobile device actually bringing down the radio resources from its end. In one embodiment, the disconnect message of block 322 is a GA-CSR-UPLINK-DIRECT-TRANSFER message from section 7.2 of the 3GPP TS 44.318 specifications.

If it is determined in block 320 that a call should not be disconnected the process could then proceed to block 324 in which the timer is reset. The process then proceeds to block 312 to continue to monitor whether data has been received.

Alternatively, the process could proceed from block 320 to block 326 if no disconnect message is to be sent. At block 326 the process ends and no longer continues to monitor whether a timer has expired.

In a further alternative, the process could proceed from block 320 to block 328 in which the process is paused until the reason the call should not be disconnected is resolved. Thus the process could, for example, wait until the call is not on hold before resuming the process by proceeding from block 328 to block 324.

The use of the RTP layer to monitor real time packets for a circuit switched connection provides a good indication of the amount of time that the circuit switched connection has been inactive.

The sending of the disconnect message in block 322 returns the network and the mobile to their idle states, freeing up network resources and also saving the battery resources of the mobile device by removing the need to have a dedicated radio channel and thus requiring a receiver on the mobile device to be on all of the time. The disconnection of the call removes all contexts within the radio access network/core network.

In some embodiments, the value of the timer could be hard coded into the mobile device or could be provisioned to the mobile device. In some cases the value of the timer may also be set by the user.

In one embodiment it is useful for the network operator to set the timer value. Reference is now made to FIG. 4.

Figure 4A:
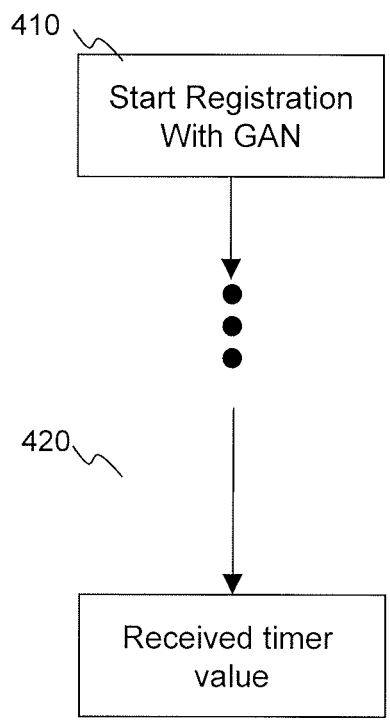
FIG. 4A is a flow diagram showing the timer value being set from mobile device perspective.
Figure 4B:
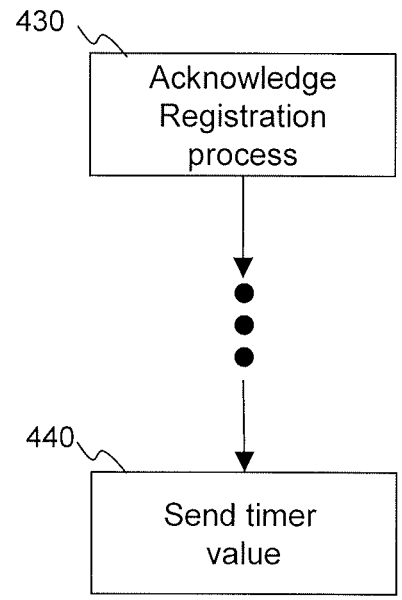
FIG. 4B is a flow diagram showing the timer value being set from network perspective.

FIG. 4A shows the registration process from the perspective of a mobile device and FIG. 4B shows the registration process from the perspective of the network.

Referring to FIG. 4A, the registration is started with the GAN at block 410.

The process then proceeds through the typical registration blocks. However, a block 420 is added in which a timer value is received from the network.

Referring to FIG. 4B, the registration process is acknowledged in block 430 and the registration with the mobile device continues as normal. A block 440 is added at the network in which a timer value is sent to the mobile. As will be appreciated, the timer value is the timer value that is received at block 420 of FIG. 4A.

Figure 5:
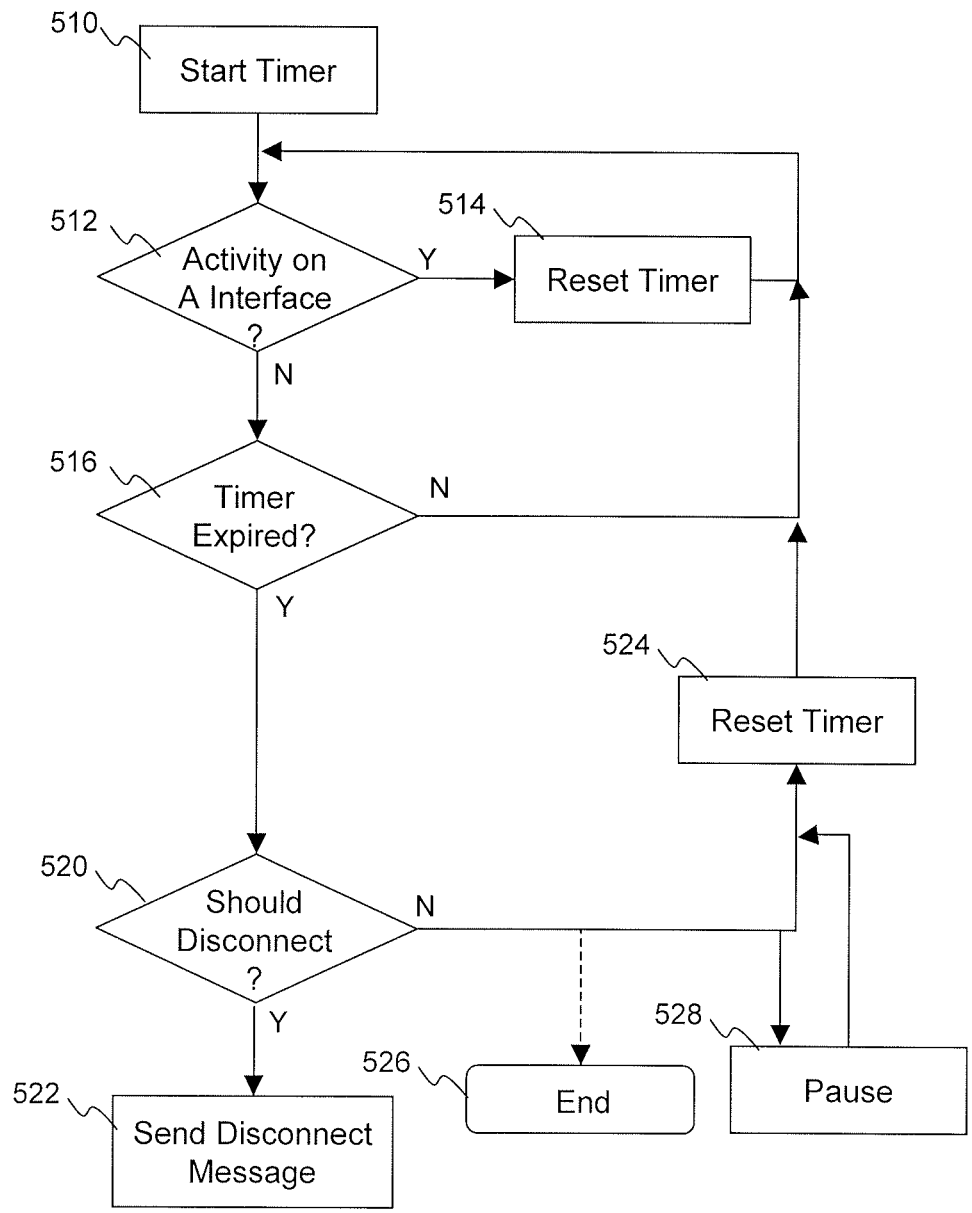
FIG. 5 is a flow diagram showing a network side initiated disconnection.

In a further embodiment, the timer may be on a network element. Reference is now made to FIG. 5. FIG. 5 shows a network side process for disconnecting a mobile device in abnormal call termination conditions when on a GAN mobile-to-mobile call. The process starts at block 510 in which an inactivity timer is started.

The process then proceeds to block 512 in which a check is made to see whether or not there has been inactivity on a particular interface. In one example, the "A" interface between the GANC and the MSC could be monitored for inactivity. Inactivity on the "A" interface would indicate the same/remote MSC and GANC no longer are communicating with the remote mobile device.

From block 512, if there is activity on the A interface, the process proceeds to block 514 in which the inactivity timer is reset and the process then continues to loop back to block 512.

Conversely, in block 512, if no activity is found on the A interface, the process proceeds to block 516 in which a check is made to determine whether the inactivity timer has expired. If no, the process proceeds back to block 512 and continues to loop as above.

If the timer has expired in block 516 the process proceeds to block 520 in which a check is made to determine whether disconnect should occur. As will be appreciated, in certain situations disconnections should not occur even if there is inactivity on the A interface. For example, if a call is on hold then inactivity could occur on the A interface but the GANC would likely know about the call being on hold.

From block 520, if disconnection should occur, the process proceeds to block 522 and a disconnect message is sent.

In one embodiment, the disconnect message is a GA-CSR Release message as specified in section 7.5 of the 3GPP TS 44.318 specifications. Specifically, in section 7.5.3 a GA-CSR release is sent from the GANC to the mobile device and a GA-CSR Release Complete is sent from the mobile device to the GANC once the release is complete.

Further, release conditions can be sent from the GANC in the GA-CSR Release message. In one embodiment the release will include an RR cause #1 which indicates an unspecified abnormal release. In other embodiments a particular RR cause could be defined for an inactivity timer time-out.

In a further embodiment, block 520 can make a further determination whether certain conditions exist that indicate whether a call should be disconnected. For example, if a call is muted or silent then this determination can be used to prevent disconnection. Moreover, this determination may be used to determine whether there are indicators that the call should be disconnected. Grammar analysis could be utilized for this functionality, for example by determining whether one party has indicated "are you there" or something similar. In the case where the grammar indicates that one party may not be responding to the other party's inquiries regarding the presence of the other party, it might indicate that the call should be disconnected. Further, background noise and volume levels could be considered within block 520 for this determination.

From block 520, if a disconnection should not occur, various options exist. These include ending the process at block 526, pausing the process at block 528 until some condition is met, at which point the process could resume, or resetting the timer at block 524 and continuing back to blocks 512 and 516.

For both the device side and network side disconnection, the above allows for the timer value to be set by the individual network/operator and thus to optimize performance on the network. The network operator could determine the call should be dropped after, for example, twenty seconds.

In other cases, the network operator may set the timer value T to an extremely high value, which in effect ensures that the timer would never expire. A high timer value could, for example, be utilized if the network operator determines the timeout should only be initiated from the network side rather than the mobile device side.

As will be appreciated, the above methods can be implemented on any mobile device. One exemplary mobile device is described below with reference to FIG. 6. The use of the mobile device of FIG. 6 is not meant to be limiting, but is provided for illustrative purposes.

Figure 6:
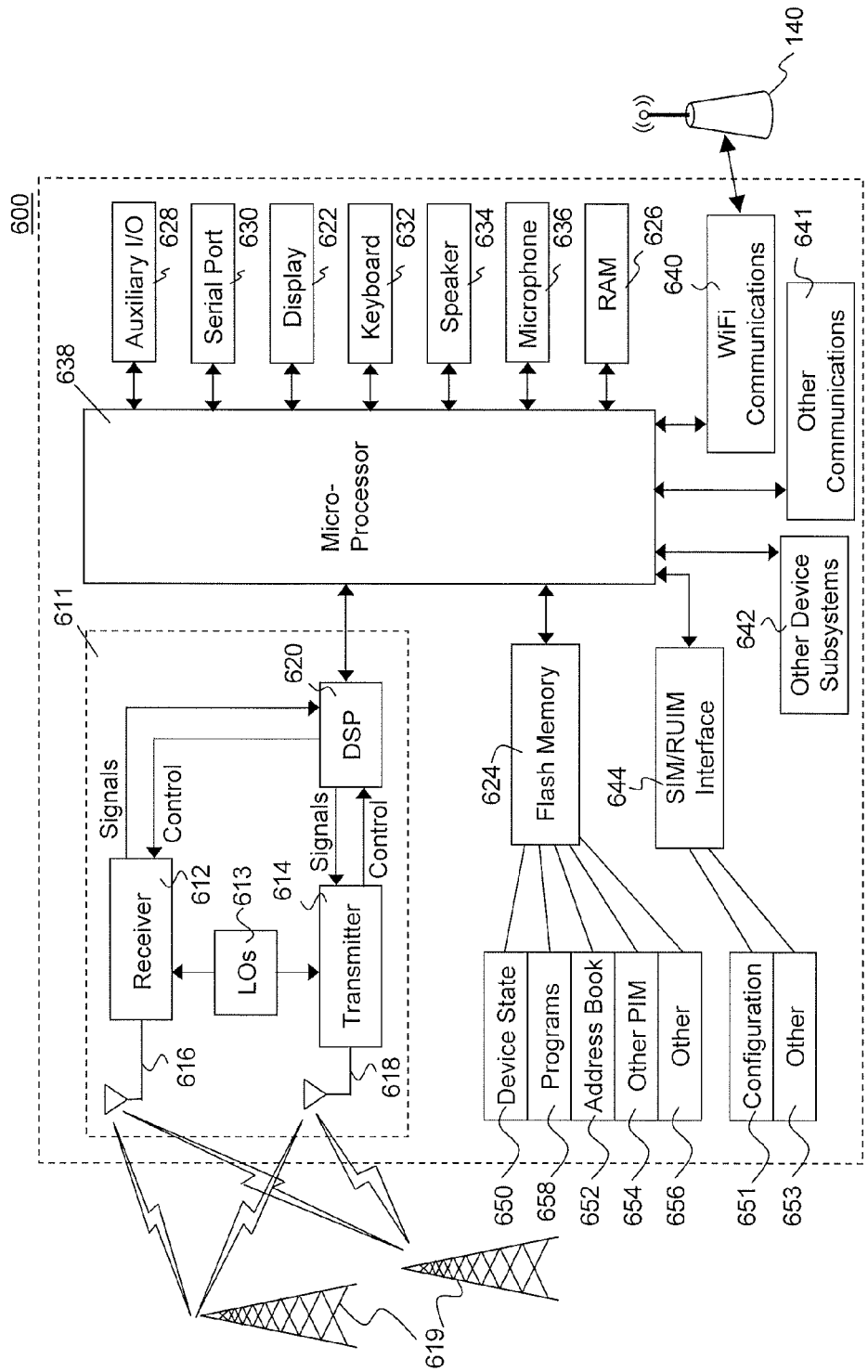
FIG. 6 is a block diagram of an exemplary mobile device.

FIG. 6 is a block diagram illustrating a mobile device apt to be used with embodiments of the apparatus and method of the present application. Mobile device 600 is a two-way wireless communication device having at least voice communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 600 is enabled for two-way communication, it can incorporate a communication subsystem 611, including both a receiver 612 and a transmitter 614, as well as associated components such as one or more, antenna elements 616 and 618, local oscillators (LOs) 613, and a processing module such as a digital signal processor (DSP) 620 The particular design of the communication subsystem 611 depends upon the communication network in which the device is intended to operate.

When required network registration or activation procedures have been completed, mobile device 600 may send and receive communication signals over the network 619. As illustrated in FIG. 6, network 619 can comprise of multiple base stations communicating with the mobile device.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Network access requirements will also vary depending upon the type of network 619. In some CDMA/UMTS networks network access is associated with a subscriber or user of mobile device 600. A mobile device may require a removable user identity module (RUIM) or a subscriber identity module (SIM) card in order to operate on a network. The SIM/RUIM interface 644 is normally similar to a card-slot into which a SIM/RUIM card can be inserted and ejected like a diskette or PCMCIA card. The SIM/RUIM card can have approximately 64K of memory and hold many key configuration 651, and other information 653 such as identification, and subscriber related information.

Mobile device 600 includes a microprocessor 638 which controls the overall operation of the device. Communication functions, including at least data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 can be stored in a persistent store such as flash memory 624, which may instead be a read-only memory (ROM) or similar storage element (not shown). Specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate each program can allocate a portion of flash memory 624 for their own data storage requirements. Microprocessor 638, in addition to its operating system functions, can enable execution of software applications on the mobile device. A predetermined set of applications which control basic operations, including at least data and voice communication applications for example, will normally be installed on mobile device 600 during manufacturing. Other applications could be installed subsequently or dynamically.

A software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application can have the ability to send and receive data items, via the wireless network 619. In an embodiment, the PIM data items are seamlessly integrated, synchronized and updated, via the wireless network 619, with the mobile device user's corresponding data items stored or associated with a host computer system. Further applications may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the microprocessor 638. Such flexibility in application installation increases the functionality of the device and may provide enhanced on-device functions, communication-related functions, or both.

In a data communication mode, a received signal such as a text message or web page download will be processed by the communication subsystem 611 and input to the microprocessor 638, which further processes the received signal for element attributes for output to the display 622, or alternatively to an auxiliary I/O device 628.

A user of mobile device 600 may also compose data items such as email messages for example, using the keyboard 632, which can be a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of mobile device 600 is similar, except that received signals would be output to a speaker 634 and signals for transmission would be generated by a microphone 636. Alternative voice or audio I/O subsystems, such as a voice message recording subsystem, may also be implemented on mobile device 600. Although voice or audio signal output is accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. Serial port 630 can further be used to connect the mobile device to a computer to act as a modem.

WiFi Communications Subsystem 640 is used for WiFi Communications and can provide for communication with access point 140, as described above with reference to FIG. 1.

Other communications subsystem(s) 641, such as a short-range communications subsystem, are further components that may provide for communication between mobile device 600 and different systems or devices, which need not necessarily be similar devices. For example, the subsystem(s) 641 may include an infrared device and associated circuits and components or a Bluetooth™ communication module to provide for communication with similarly enabled systems and devices.

Figure 7:
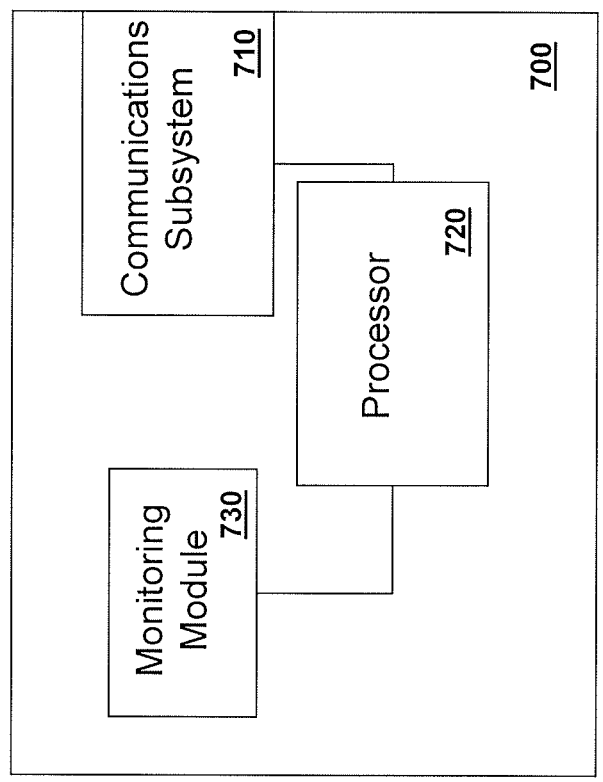
FIG. 7 is a block diagram of a simplified gateway to core network element.

Reference is now made to FIG. 7, which shows a simplified block diagram of a gateway to core network element. Such a gateway to core network element could be, for example, GANC 144 of FIG. 1.

Gateway to core network element 700 includes a communications subsystem 710 adapted to communicate with other elements within the network. In one embodiment, such communication includes communication with an MSC 154 from FIG. 1. It also includes communications over an Internet protocol network 142.

A processor 720 is adapted to control the network element 700 and a monitoring module 730 is adapted to monitor communications over communications subsystem 710 to determine whether there is inactivity on the communication subsystem. In one embodiment, the monitoring module could monitor the "A" interface on communication subsystem 710 and determine whether or not there is inactivity for a predetermined time, as illustrated with reference to FIG. 5. In another embodiment, monitoring module 730 may monitor a keep-alive signal from a first UE that is in a call with a second UE. If monitoring module 730, alone or in combination with another component of network element 700, monitors that a keep-alive signal has not been received from the first UE for a pre-determined amount of time, network element 700 can send a disconnect message to the second UE. The second UE can then end the call. The pre-determined amount of time may be set as a time longer than a period of time between keep-alive signals, which in an embodiment may be 480 ms.

Various options for the above listed messages include, but are not limited to: a KEEP ALIVE message, as defined in 3GPP 44.318 section 10.1.14; a DISCONNECT message (network to mobile station direction), as defined in 3GPP TS 24.008 section 9.3.7.1; and a DISCONNECT message (mobile station to network direction) as defined in 3GPP 24.008 section 9.3.7.2.

The embodiments described herein are examples of structures, systems or methods having elements corresponding to elements of the techniques of the present application. The above written description may enable those skilled in the art to make and use embodiments having alternative elements that likewise correspond to the elements of the techniques of the present application. The intended scope of the techniques of the above application thus includes other structures, systems or methods that do not differ from the techniques of the present application as described herein, and further includes other structures, systems or methods with insubstantial differences from the techniques of the present application as described herein.

The invention claimed is:

1. A method for releasing radio resources from a mobile device during a call in a gateway to core network comprising:
    monitoring at the mobile device for an inactive period following receipt of each speech packet from the network at the mobile device for the call to determine if the inactive period exceeds a predetermined threshold before receipt of another speech packet at the mobile device, wherein the received speech packets are generated in a GERAN (GSM EDGE Radio Access Network) codec layer of the network and wherein the received speech packets are processed in a GERAN codec layer of the mobile device; and
    responsive to a determination that the inactive period has exceeded the predetermined threshold, releasing radio resources from a mobile device by initiating a disconnection of the call from the gateway to network wherein the received speech packets are received across an A/Iu-cs interface.

2. The method of claim 1, wherein the inactive period is monitored by a timer.

3. The method of claim 2, wherein the timer is implemented in hardware or software on the mobile device.

4. The method of claim 2, wherein the monitoring is performed by a real time transport protocol layer on the mobile device.

5. The method of claim 4, wherein the real time transport protocol layer is adapted to reset the timer if a circuit switched packet is detected.

6. The method of claim 1, wherein the initiating comprises sending a disconnect message from the mobile device to the gateway to core network.

7. The method of claim 6, wherein the initiating further comprises releasing radio resources from the mobile device.

8. The method of claim 1, wherein, prior to the initiating, a determination is made whether to initiate the disconnection, said determination causing the initiating to be skipped if it is determined that a disconnection should not occur.

9. The method of claim 8, wherein the determination is made by a call control layer at the mobile device.

10. The method of claim 9, wherein the call control layer utilizes supplementary service logic to make the determination.

11. The method of claim 2, wherein a value for the timer is hard coded into the mobile device.

12. The method of claim 2, wherein a value for the timer is received from the gateway to core network upon registration of the mobile device with the gateway to core network.

13. A mobile device adapted to release radio resources for a call in a gateway to core network comprising:
    a communications subsystem;
    a monitoring module adapted to monitor for an inactive period following receipt of a speech packet from the network at the mobile device, wherein the received speech packet is generated in a GERAN (GSM EDGE Radio Access Network) codec layer for the call, and to determine if the inactive period exceeds a predetermined threshold before receipt of another speech packet at the mobile device and wherein the received speech packets are processed in a GERAN codec layer of the mobile device; and
    a processor configured to initiate a disconnection from the gateway to core network if the inactive period exceeds the predetermined threshold and wherein the received speech packets are received across an A/Iu-cs interface.

14. The mobile device of claim 13, wherein the monitoring module utilizes a timer.

15. The mobile device of claim 14, wherein the timer is implemented in hardware or software.

16. The mobile device of claim 14, wherein the monitoring module within a real time transport protocol layer on the mobile device.

17. The mobile device of claim 16, wherein the real time transport protocol layer is adapted to reset the timer if a circuit switched packet is detected.

18. The mobile device claim 13, wherein the processor is adapted to send a disconnect message using the communications subsystem from the mobile device to the gateway to core network if the processor determines the disconnection should be initiated.

19. The mobile device of claim 18, wherein the processor is further adapted to release radio resources if the processor determines the disconnection should be initiated.

20. The mobile device of claim 13, wherein the processor includes a call control layer adapted to use supplementary service logic to determine whether a disconnection should be initiated.

21. The mobile device of claim 14, wherein a value for the timer is hard coded into the mobile device.

22. The mobile device of claim 14, wherein a value for the timer is received over the communications subsystem from the gateway to core network upon registration of the mobile device with the gateway to core network.

23. A gateway to core network element adapted to release radio resources for a call comprising:
- a communications subsystem;
- a monitoring module adapted to monitor for an inactive period following receipt of a speech packet at the network element from a mobile device, wherein the speech packet is generated in a GERAN (GSM EDGE Radio Access Network) codec layer for the call, to determine if the inactive period exceeds a predetermined threshold before receipt of another speech packet at the network element wherein the speech packets are generated in the GERAN codec layer of the mobile device; and
- a processor configured to initiate a disconnection with the mobile device if the inactive period exceeds the predetermined threshold wherein the gateway to core network element is a generic access network controller and wherein the monitoring module is adapted to monitor an A/Iu-cs interface.

* * * * *